(12) United States Patent
Capra

(10) Patent No.: US 11,569,644 B2
(45) Date of Patent: Jan. 31, 2023

(54) ELECTRICAL BOX INSTALLATION TOOL

(71) Applicant: James Capra, Winter Haven, FL (US)

(72) Inventor: James Capra, Winter Haven, FL (US)

( * ) Notice: Subject to any disclaimer, the term of this patent is extended or adjusted under 35 U.S.C. 154(b) by 320 days.

(21) Appl. No.: 17/066,651

(22) Filed: Oct. 9, 2020

(65) Prior Publication Data

US 2021/0135438 A1 May 6, 2021

Related U.S. Application Data

(60) Provisional application No. 62/930,095, filed on Nov. 4, 2019.

(51) Int. Cl.
*H02G 3/12* (2006.01)
*G01C 9/02* (2006.01)

(52) U.S. Cl.
CPC ............. *H02G 3/12* (2013.01); *G01C 9/02* (2013.01)

(58) Field of Classification Search
CPC .................................. H02G 3/12; G01C 9/02
USPC ............................................. 33/528, DIG. 10
See application file for complete search history.

(56) References Cited

U.S. PATENT DOCUMENTS

| | | | | |
|---|---|---|---|---|
| 2,990,172 A * | 6/1961 | Gianotta | ............... | H02G 3/125 269/254 R |
| 4,589,211 A * | 5/1986 | Policka | .................. | B25H 7/04 D10/64 |
| 4,793,069 A * | 12/1988 | McDowell | ............... | H02G 1/00 D10/64 |
| 5,222,303 A * | 6/1993 | Jardine | .................... | G01B 3/02 33/528 |
| 5,491,902 A * | 2/1996 | Uhrin | ....................... | H02G 1/00 33/528 |
| 5,813,130 A * | 9/1998 | MacDowell | ............ | H02G 1/00 33/528 |
| 5,860,219 A * | 1/1999 | Wilkinson | .............. | H02G 1/00 33/528 |
| 6,223,445 B1 * | 5/2001 | Schuette, Jr. | ........... | B25H 7/04 33/528 |
| 6,434,848 B1 * | 8/2002 | Gordon | ................... | E04F 21/04 33/528 |
| 6,576,837 B1 * | 6/2003 | Pimentel | ................. | H02G 3/14 33/528 |
| 6,765,146 B1 * | 7/2004 | Gerardo | .................. | H02G 1/00 174/53 |
| 7,434,326 B2 * | 10/2008 | Gifford | ................. | H02G 3/126 33/528 |

(Continued)

*Primary Examiner* — George B Bennett
(74) *Attorney, Agent, or Firm* — Brennan, Manna & Diamond, LLC

(57) ABSTRACT

A template for use in installing electrical boxes. The template may be used to install electrical boxes in both new and old work. An elongated member is configured to grip and frictionally engage a wall stud with a pair of stud gripping components. A plurality of spacers may be inserted between the elongated member and the wall stud to set the installation depth based on the thickness of the drywall to be installed. A pair of electrical cutouts are positioned along the elongated member at a desired height to locate a height of the electrical boxes. A second pair of cutouts are positioned along the elongated member at a second desired height to locate a second height of the electrical boxes. In an additional embodiment, the template is a mat with an electrical box cutout for locating the installation position for the electrical boxes on a finished wall.

20 Claims, 7 Drawing Sheets

(56) References Cited

U.S. PATENT DOCUMENTS

| | | | |
|---|---|---|---|
| 7,454,844 B1* | 11/2008 | Ruby | H02G 1/00 33/528 |
| 9,083,166 B2* | 7/2015 | Gagne | H02G 3/12 |
| 9,653,899 B2* | 5/2017 | Salian | F16B 5/0016 |
| 10,084,298 B2* | 9/2018 | Terwilleger | H02G 3/125 |
| 10,316,531 B2* | 6/2019 | McGowan | E04H 3/14 |
| 10,668,582 B1* | 6/2020 | Rogers | B23P 19/04 |
| 11,297,910 B1* | 4/2022 | Gerecht | A44C 3/002 |
| 2004/0040167 A1* | 3/2004 | Hall | H02G 1/00 33/528 |
| 2008/0148586 A1* | 6/2008 | Morin | H02G 3/125 33/528 |
| 2012/0096724 A1* | 4/2012 | Eyermann | G01B 3/00 33/354 |
| 2016/0141852 A1* | 5/2016 | Gagne | H02G 3/123 174/54 |
| 2016/0226232 A1* | 8/2016 | Gagne | H02G 3/123 |
| 2019/0226843 A1* | 7/2019 | Zhang | G01C 9/02 |
| 2021/0143621 A1* | 5/2021 | Kough | H02G 3/123 |

* cited by examiner

ELECTRICAL BOX INSTALLATION TOOL

CROSS-REFERENCE TO RELATED APPLICATION

The present application claims priority to, and the benefit of, U.S. Provisional Application No. 62/930,095, which was filed on Nov. 4, 2019 and is incorporated herein by reference in its entirety.

BACKGROUND

The present invention generally relates to a tool for installing electrical boxes, and more specifically to a template configured to provide for the uniform installation of electrical boxes in both new and old work. Accordingly, the present specification makes specific reference thereto. However, it is to be appreciated that aspects of the present invention are also equally amenable to other like applications, devices and methods of manufacture.

Electrical boxes, or junction boxes are designed to enclose and protect wire connections and provide a safety barrier. They are used to contain switches and outlets while protecting against short circuits and fire and shock hazards. They form part of the electrical conduit wiring system in a building. They are usually mounted within a wall or ceiling. They can also be installed as "new work" before the installation of drywall, or as "old work" after the installation of the drywall.

Whether installed before or after the drywall, electrical box installation can be a difficult, frustrating, and time consuming process. The boxes are not easily installed uniformly at the same height. While there is no precise national code requirement for installation height, it is standard practice for wall switches to be installed approximately 48 inches above the floor, but this distance typically ranges from 43 to 53 inches, depending on preferences. It is also common practice for receptacle outlet boxes to be installed with the bottom edge between approximately 12 and 16 inches above the floor.

The electrical boxes can be also be difficult to install at the proper depth, so they are flush with the finished wall. Without some kind of guide, it can be difficult to install the boxes with the proper offset to ensure the front edges of the electrical boxes will be flush with the finished drywall surface. Measurements must constantly be made when installing the boxes and the corresponding wires.

Installing a box prior to the drywall is easier as the metal or wood wall studs are exposed. The height from the floor must be measured for each box. Once height is determined, the depth of box insertion must be determined. The front edge of the box must be flush with the finished surface. Installers usually create a jug from a scrap of drywall to help gauge the proper depth. The height and depth measurements must both be done for each box installation which requires multiple steps.

Installing a box after the drywall is in place is even more difficult. "Old work" boxes do not come with templates. The installer is forced to make a lot of measurements and transfer them to the wall with a ruler, try to use the front of the box as a template, or make a paper template to assist in installation. As these boxes taper from smaller to larger, the back side of the box will not work as a template. If the drywall cuts are not correct, the box will not stay in position and will fall into the wall. This installation similarly requires multiple steps.

In this manner, the improved installation tool of the present invention accomplishes all of the forgoing objectives, thereby providing an easy solution to mounting electrical boxes uniformly. A primary feature of the present invention provides users with an electrical box installation tool designed to install electrical boxes at the same height so that the electrical boxes are flush with the wall once installed. Finally, the improved electrical box installation tool of the present invention is capable of saving time and effort when installing electrical boxes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a template for installing an electrical box. The template comprises an elongated member. The elongated member is a rigid flat bar that extends along a length of a wall stud. The template further comprises a pair of stud gripping components. Each of the stud gripping components extend substantially perpendicularly from a back side of the elongated member. Each of the stud gripping components comprise a pair of stud engaging elements. The pair of stud engaging elements are substantially parallelly spaced apart approximately a width of a side of the wall stud. When the template is positioned over the wall stud, the pair of stud engaging elements frictionally grab or engage the wall stud holding the template in place. One of the stud gripping components may be positioned toward a top of the elongated member and the other is positioned toward a bottom of the elongated member.

The template further comprises a pair of electrical box cutouts. Each electrical box cutout extends inward into a side of the elongated member opposite the opposing cutout. The pair of electrical box cutouts are positioned along the elongated member at a height corresponding to a preferred height for electrical box installation. Each electrical box cutout is dimensioned to locate and position a side of an electrical box against the wall stud. A space between the pair of electrical box cutouts is approximately a width of the side of the wall stud.

The template further comprises a plurality of spacers. The plurality of spacers are rectangular bars of varying thicknesses that correspond to the various thicknesses of drywall. One or more of the plurality of spacers are positional between the back side of the elongated member and the wall stud to ensure the electrical box is installed flush with a finished wall. The template further comprises a level sensing component. The level sensing component may comprise a horizontal level and a vertical level to adjust plumb.

In an additional embodiment, a template for installing an electrical box comprises an elongated member. The elongated member is a rigid flat bar that extends along a length of a wall stud. The template further comprises a pair of stud gripping components. Each of the stud gripping components extend substantially perpendicularly from a back side of the elongated member. Each of the stud gripping components comprise a pair of stud engaging elements. The pair of stud engaging elements are substantially parallelly spaced apart approximately a width of a side of the wall stud. When the template is positioned over the wall stud, the pair of stud engaging elements frictionally grab or engage the wall stud holding the template in place. One of the stud gripping components may be positioned toward a top of the elongated member and the other is positioned toward a bottom of the elongated member.

The template further comprises a first pair of electrical box cutouts and a second pair of electrical box cutouts. Each electrical box cutout extends inward into a side of the elongated member opposite the opposing cutout. The first pair of electrical box cutouts are positioned along the elongated member at a first height corresponding to a preferred height for electrical box installation. The second pair of electrical box cutouts are positioned along the elongated member at a second height corresponding to an additional preferred height for electrical box installation. Each electrical box cutout is dimensioned to locate and position a side of an electrical box against the wall stud. A space between the pair of electrical box cutouts is approximately a width of the side of the wall stud.

The template further comprises a plurality of spacers. The plurality of spacers are rectangular bars of varying thicknesses that correspond to the various thicknesses of drywall. One or more of the plurality of spacers are positional between the back side of the elongated member and the wall stud to ensure the electrical box is installed flush with a finished wall. The template further comprises a level sensing component. The level sensing component may comprise a horizontal level and a vertical level to adjust plumb.

In an additional embodiment, a template for installing an electrical box comprises a mat plate and an electrical box cutout within the mat plate. The electrical box cutout is dimensioned to receive a single gang electrical box or a double gang electrical box. The template further comprises a plurality of wall attachment components for holding the mat plate to a wall. The template further comprises a level sensing component. The level sensing component may comprise a horizontal level and a vertical level to adjust plumb.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
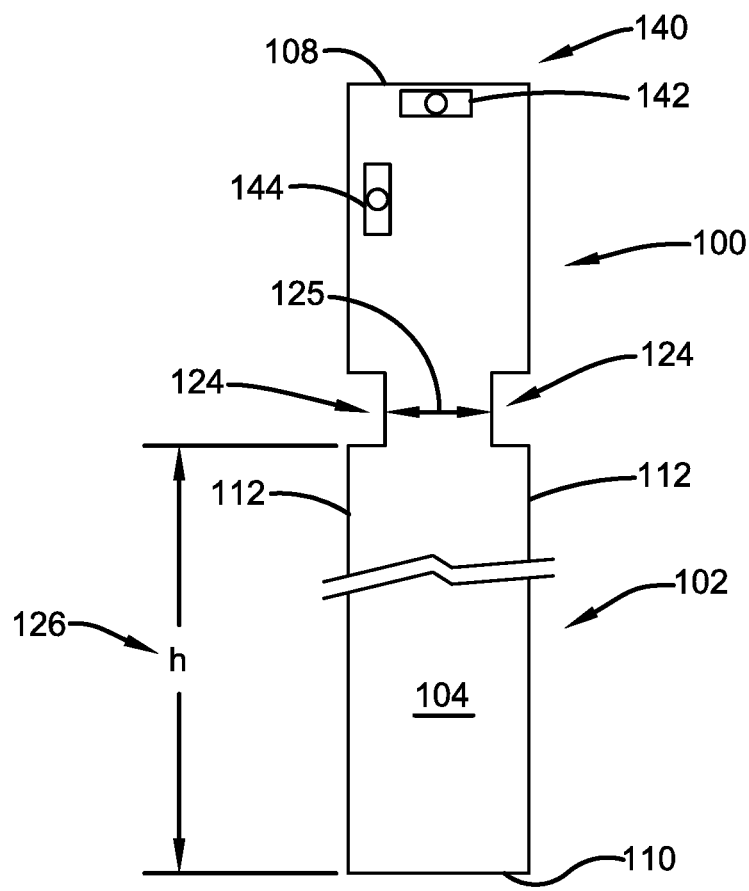
FIG. 1 illustrates an overhead view of one embodiment of a template of the present invention for use in installing a plurality of electrical boxes in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a template-style installation tool for electrical box and wiring installation. The template is designed to facilitate installation of electrical boxes at substantially identical heights and that are flush with the finished wall once installed. The templates feature a series of cutouts on both sides that can be positioned at various intervals such as between approximately 12 and 16 inches and between approximately 40 to 53 inches from the bottom of the template. The template comprises a level to further assist with proper positioning. The template allows the width to be determined if a single gang box or double gang box is being installed saving extensive time and effort when installing electrical boxes. The device can be placed on a stud, and the electrical boxes can be installed at pre-determined locations along the template, ensuring the boxes are located at a consistent height during installation.

The template comprises an elongated section of material, such as metal or plastic, that can be up to six feet in length or more with a number of cutouts. The cutouts in one embodiment may be positioned so that the bottom of each cutout is 16 and 44 inches from the bottom of the elongated section on each side of the elongated section. The cutouts may be approximately 3.75 inches in height and approximately one inch inward. In an additional embodiment, there may be one pair of cutouts at approximately 40 inches from the bottom of the elongated section on each side of the elongated section. In an additional embodiment, a mat template between approximately 6 and $^{11}/_{16}{}^{th}$ and 8½ inches wide and approximately 5 and $^{3}/_{8}{}^{th}$ inches in height. There may be a level embedded in or attached to the mat which may be manufactured from metal or plastic material. The width would be determined based on whether a single or double gang box is being installed.

Figure 2:
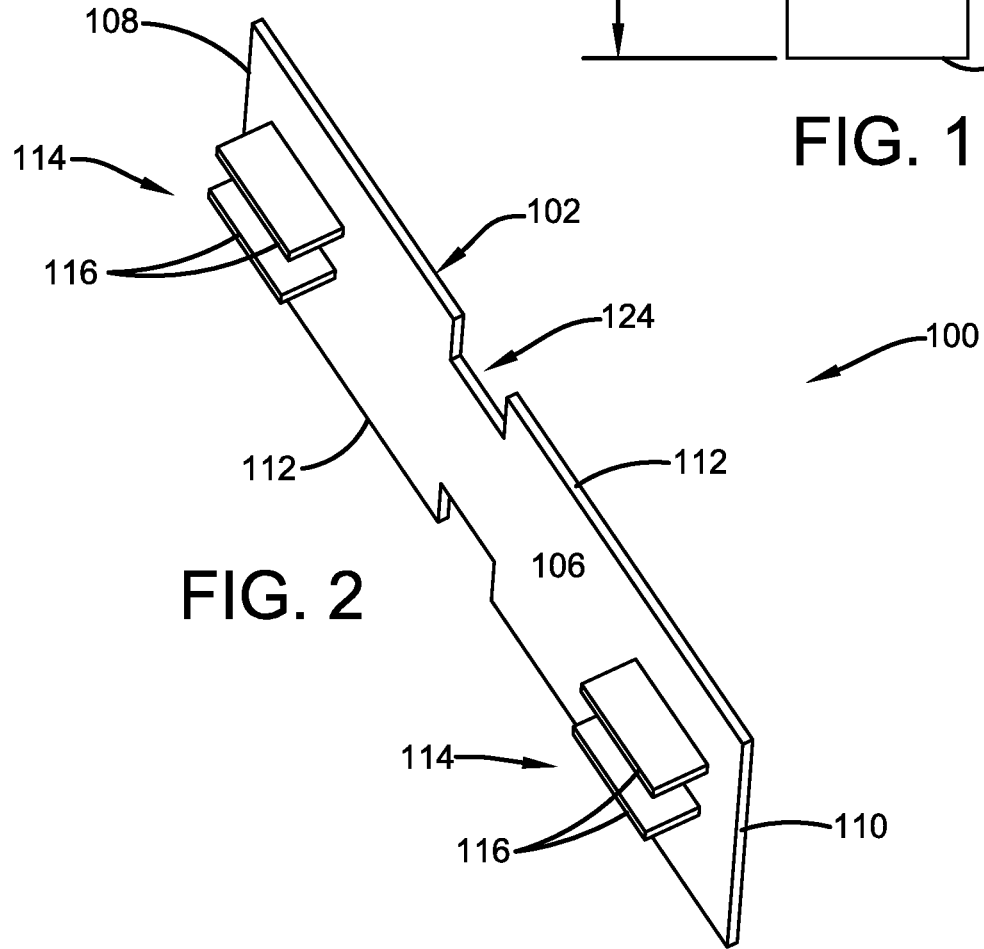
FIG. 2 illustrates a perspective view of the template of the present invention for use in installing the plurality of electrical boxes in accordance with the disclosed architecture.
Figure 3:
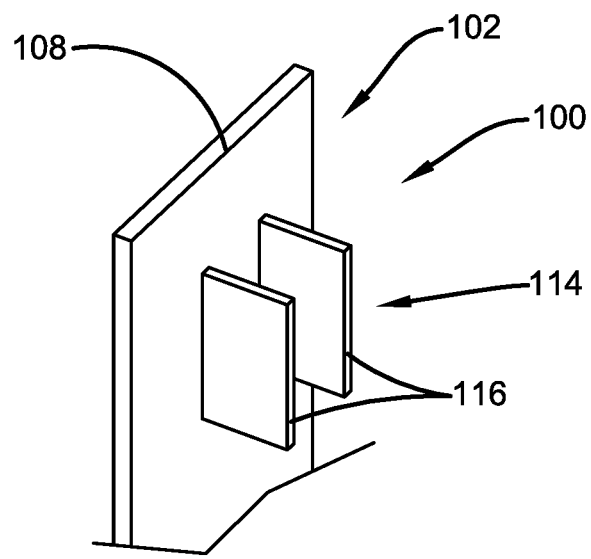
FIG. 3 illustrates a cutaway perspective view of a pair of stud engaging elements of a pair of stud gripping components of the template of the present invention in accordance with the disclosed architecture.
Figure 4:
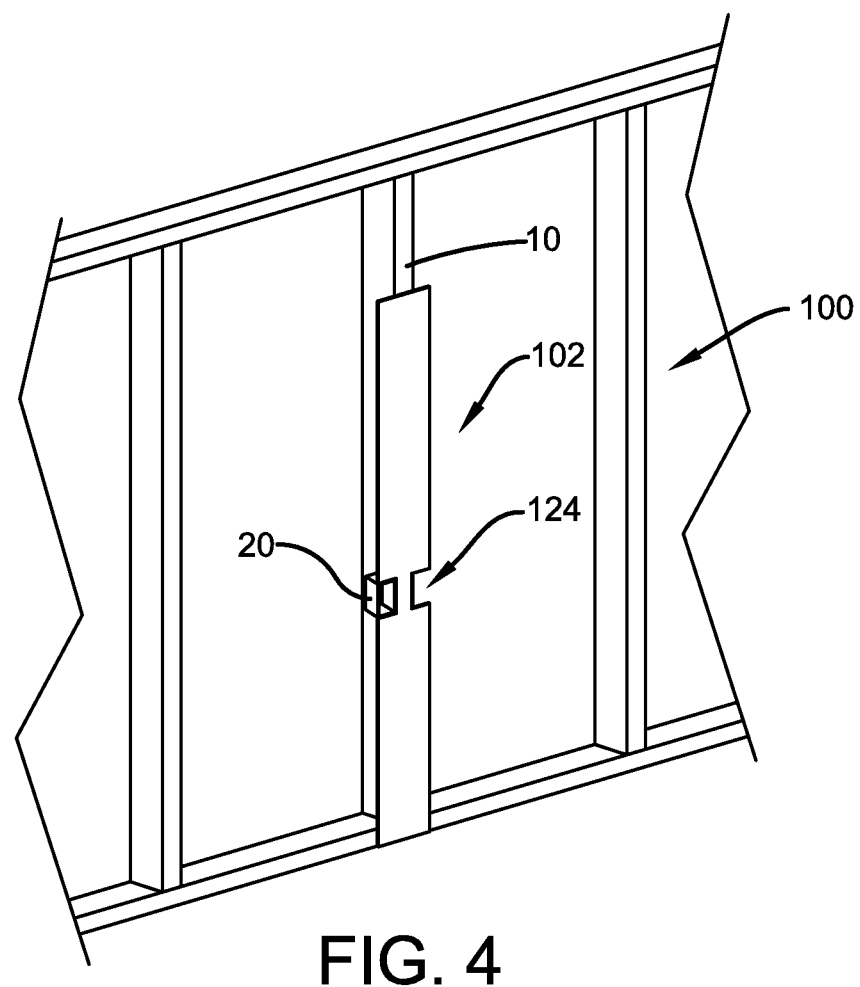
FIG. 4 illustrates a front perspective view of the template of the present invention for use in installing the plurality of electrical boxes engaging a wall stud in accordance with the disclosed architecture.

Referring initially to the drawings, FIGS. 1-7 illustrate a template 100 for installing an electrical box 20. As illustrated in FIG. 1, the template 100 comprises an elongated member 102. The elongated member 102 is preferably a rigid and flat metal or plastic bar that extends along a length of a wall stud 10 as illustrated in FIG. 4, though the use of other suitable materials is also contemplated. The elongated member 102 comprises a frontside 104, a back side 106, a top 108, a bottom 110, and a pair of sides 112. The back side 106 is positional against the wall stud 10.

Figure 5:
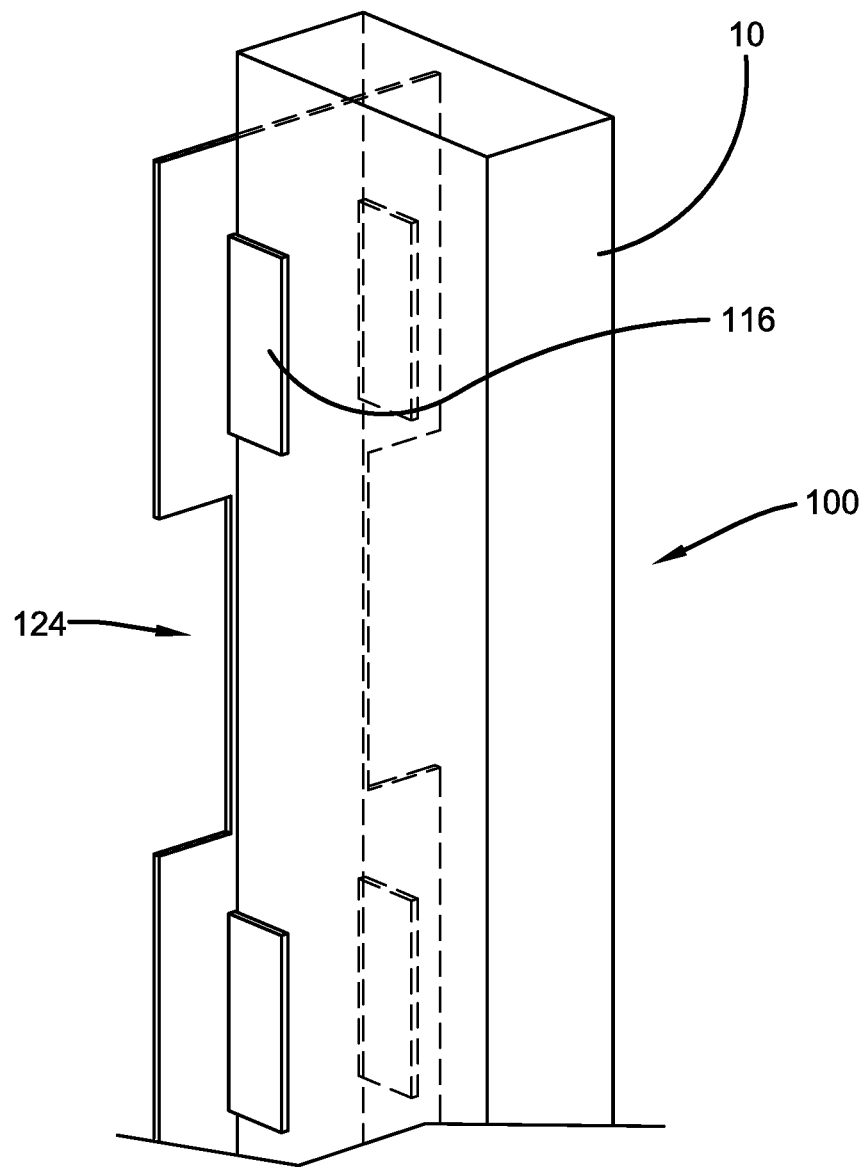
FIG. 5 illustrates a rear perspective view of the template of the present invention for use in installing the plurality of electrical boxes engaging the wall stud in accordance with the disclosed architecture.

As illustrated in FIGS. 2, and 3, the template 100 further comprises a pair of stud gripping components 114. Each of the stud gripping components 114 extend substantially perpendicularly from the back side 106 of the elongated member 102. Each of the stud gripping components 114 comprise a pair of stud engaging elements 116. The pair of stud engaging elements 116 are a pair of rails or bars substantially parallelly spaced apart approximately a width of a side of the wall stud 10. When the template 100 is positioned over the wall stud 10, the pair of stud engaging elements 116 frictionally grab or engage the wall stud 10 holding the template 100 in place as illustrated in FIG. 5. One of the stud gripping components 114 may be positioned toward the top 108 of the elongated member 102 and the other stud gripping component 114 is positioned toward the bottom 110 of the elongated member 102 as illustrated in FIG. 2.

The template 100 further comprises a pair of electrical box cutouts 124. Each electrical box cutout 124 extends inward into one of the pair of sides 112 of the elongated member 102 opposite the opposing electrical box cutout 124. The pair of electrical box cutouts 124 are positioned along the elongated member 102 at a height 126 corresponding to a preferred height for electrical box installation. In one example, the height may allow each electrical box cutout 124 to be centered approximately between 41.5 and 42 inches from the bottom 110 of the elongated member 102, although the height may vary up to the entire length of the elongated member 102 as desired.

Figure 6:
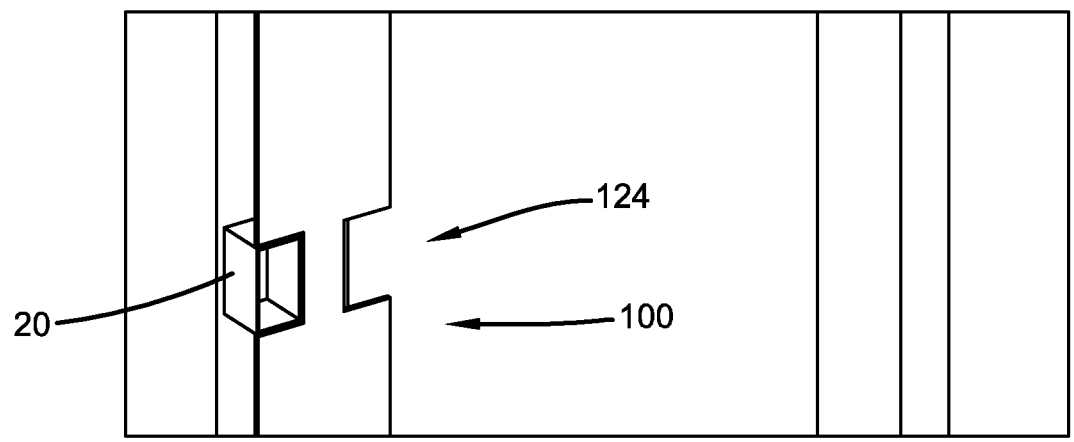
FIG. 6 illustrates a cutaway perspective view of an electrical box engaging one of a pair of electrical box cutouts of the template of the present invention in accordance with the disclosed architecture.

As illustrated in FIG. 6, each electrical box cutout 124 is dimensioned to locate and position a side of the electrical box 20 against the wall stud 10. In one example, each electrical box cutout 124 may be approximately 3.75 inches in height and approximately one inch inward, although the dimensions may vary depending on the size of the electrical boxes 20 to be installed. A space 125 between the pair of electrical box cutouts 124 is typically approximately a width of the side of the wall stud 10.

Figure 7:
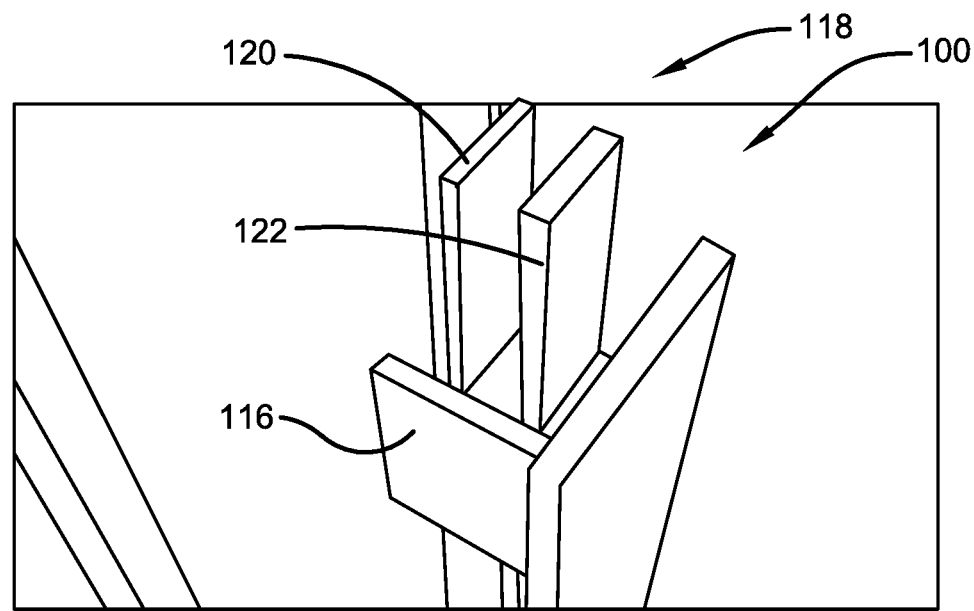
FIG. 7 illustrates a cutaway perspective view of a plurality of spacers of the template of the present invention for adjusting the template against the wall stud in accordance with the disclosed architecture.

As illustrated in FIG. 7, the template 100 further comprises a plurality of spacers 118. The plurality of spacers 118 are rectangular bars or blocks of varying thicknesses 120 and 122 that correspond to the various thicknesses of drywall, for example, $¼^{th}$, $⅜^{th}$, ½, $¾^{th}$, or the like inch thick drywall. One or more of the plurality of spacers 118 may be positioned between the back side 106 of the elongated member 102 and the wall stud 10 to ensure the electrical box 20 is installed flush with a finished wall 30. The plurality of spacers 118 may be positioned between each pair of stud engaging elements 116 and held in place by friction, magnets, mechanical fasteners, or the like.

As illustrated in FIG. 1, the template 100 may further comprise a level sensing component 140. The level sensing component 140 may be embedded in or attached to the front side 104 of the elongated member 102. The level sensing component 140 may comprise a horizontal level 142 and a vertical level 144 to adjust plumb against the wall stud 10.

Figure 8:
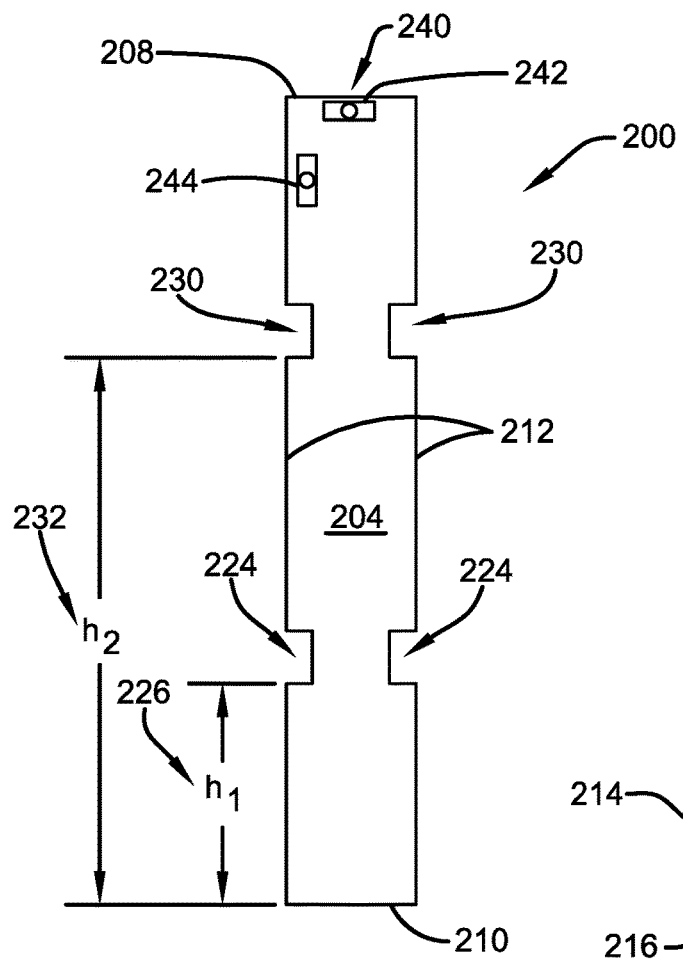
FIG. 8 illustrates an overhead view of one embodiment of a template of the present invention for use in installing a plurality of electrical boxes in accordance with the disclosed architecture.
Figure 9:
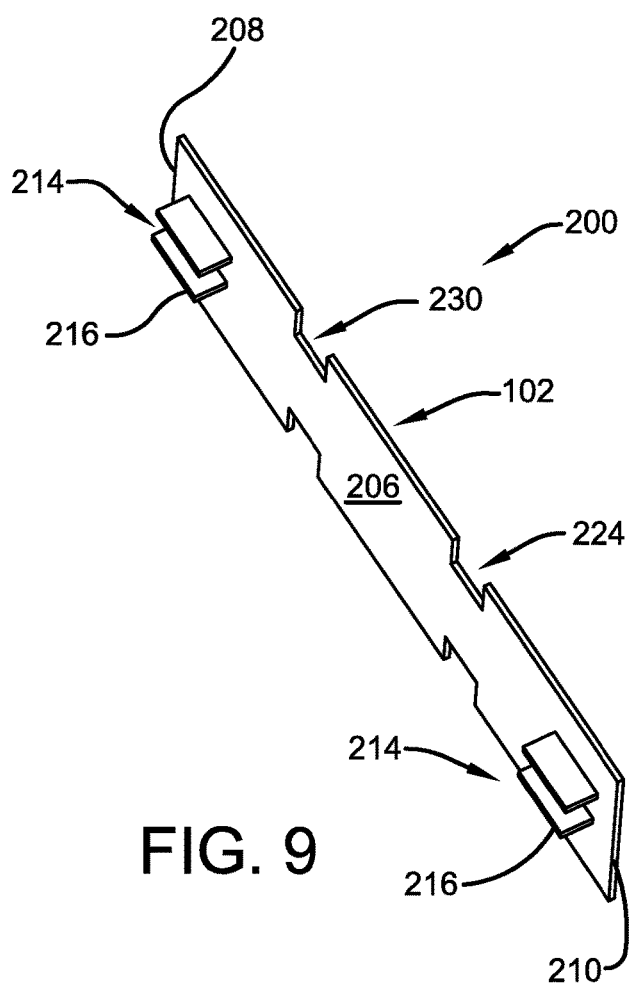
FIG. 9 illustrates a perspective view of the template of the present invention for use in installing the plurality of electrical boxes in accordance with the disclosed architecture.
Figure 10:
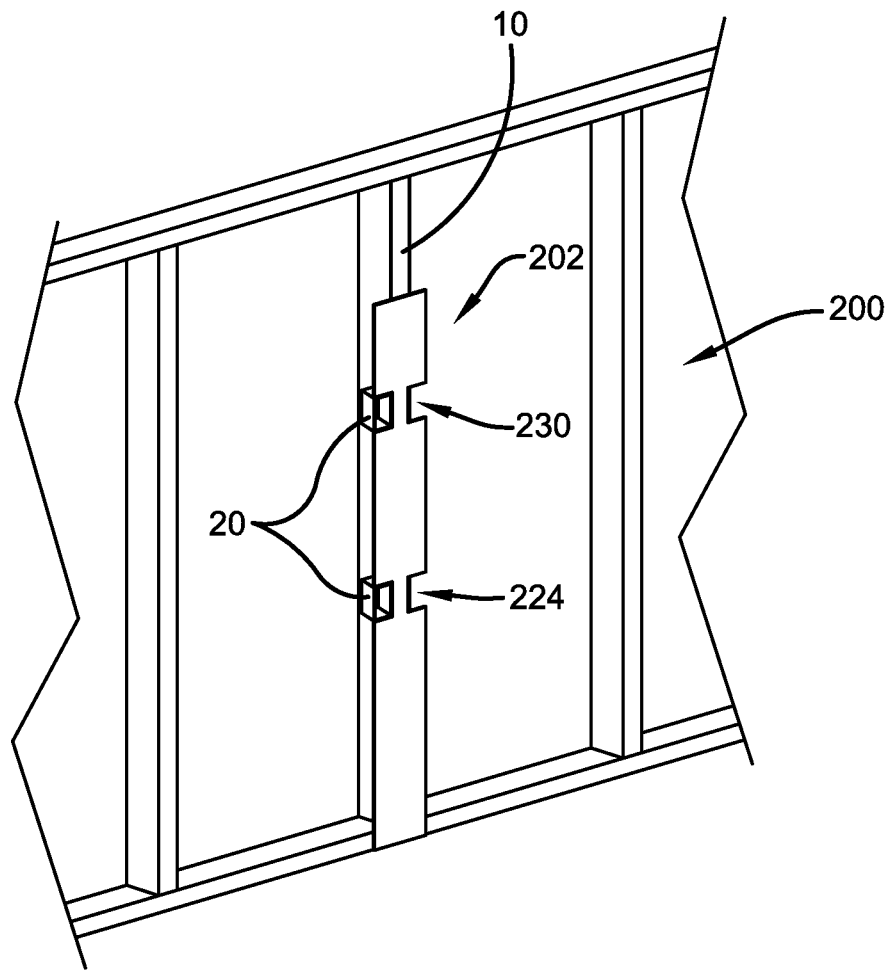
FIG. 10 illustrates a front perspective view of the template of the present invention for use in installing the plurality of electrical boxes engaging a wall stud in accordance with the disclosed architecture.

In an additional embodiment, a template 200 for installing an electrical box 20 is illustrated in FIGS. 8-10. As illustrated in FIG. 8, the template 200 comprises an elongated member 202. The elongated member 202 is a rigid flat metal or plastic bar that extends along a length of a wall stud 10 as illustrated in FIG. 10. The elongated member 202 comprises a frontside 204, a back side 206, a top 208, a bottom 210, and a pair of sides 212. The back side 206 is positional against the wall stud 10.

As illustrated in FIG. 9, the template 200 further comprises a pair of stud gripping components 214. Each of the stud gripping components 214 extend substantially perpendicularly from the back side 206 of the elongated member 202. Each of the stud gripping components 214 comprise a pair of stud engaging elements 216. The pair of stud engaging elements 216 are a pair of rails or bars substantially parallelly spaced apart approximately a width of a side of the wall stud 10. When the template 200 is positioned over the wall stud 10, the pair of stud engaging elements 216 frictionally grab or engage the wall stud 10 holding the template 200 in place. One of the stud gripping components 214 may be positioned toward the top 208 of the elongated member 202 and the other stud gripping component 214 is positioned toward the bottom 210 of the elongated member 202.

The template 200 further comprises a first pair of electrical box cutouts 224 and a second pair of electrical box cutouts 230. Each electrical box cutout 224 and 230 extends inward into one of the pair of sides 212 of the elongated member 202 opposite the opposing electrical box cutout 224 and 230. The first pair of electrical box cutouts 224 are positioned along the elongated member 202 at a first height 226 corresponding to a preferred height for electrical box installation. The second pair of electrical box cutouts 230 are positioned along the elongated member 202 at a second height 232 corresponding to an additional preferred height for electrical box installation.

In one example, the first pair of electrical box cutouts 224 are centered approximately between 17.5 and 18 inches from the bottom 210 of the elongated member 202; and the second pair of electrical box cutouts 230 are centered approximately between 45.5 and 46 inches from the bottom 210 of the elongated member 202. However, as in the previous embodiment, the first and second heights 226 and 232 may vary up to the entire length of the elongated member 202 as desired. Each electrical box cutout 124 and 230 is dimensioned to locate and position a side of the electrical box 20 against the wall stud 10. A space (similar to 125) between each pair of electrical box cutouts 224 and 230 is typically approximately a width of the side of the wall stud 10.

The template 200 further comprises a plurality of spacers (similar to 118). The plurality of spacers are rectangular bars or blocks of varying thicknesses (similar to 120 and 122) that correspond to the various thicknesses of drywall. One or more of the plurality of spacers may be positioned between the back side 206 of the elongated member 202 and the wall stud 10 to ensure the electrical box 20 is installed flush with a finished wall 30. The plurality of spacers may be located between each pair of stud engaging elements 216 and held in place by friction, magnets, mechanical fasteners, or the like.

The template 200 may further comprise a level sensing component 240. The level sensing component 240 may be embedded in or attached to the front side 204 of the elongated member 202. The level sensing component 240 may comprise a horizontal level 242 and a vertical level 244 to adjust plumb against the wall stud 10.

Figure 11:
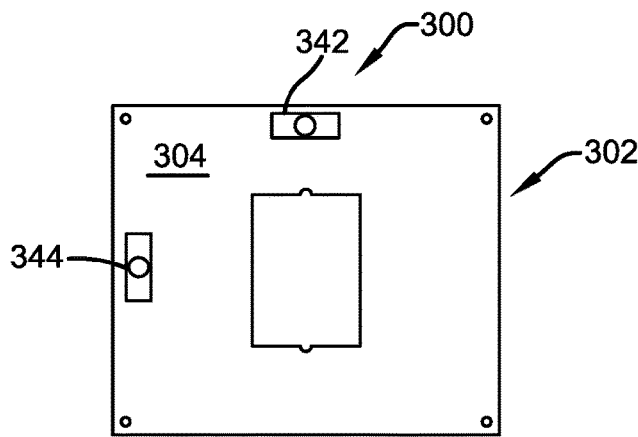
FIG. 11 illustrates an overhead perspective view of one embodiment of a template of the present invention for use in installing a plurality of electrical boxes in accordance with the disclosed architecture.
Figure 12:
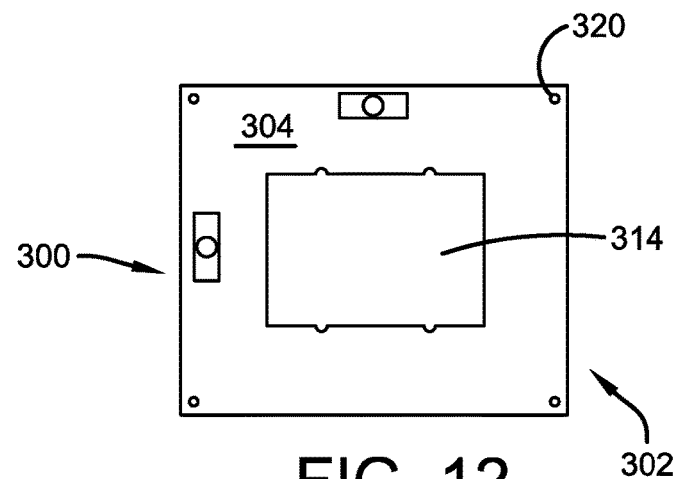
FIG. 12 illustrates an overhead perspective view of the template comprising a double gang cutout portion of the present invention in accordance with the disclosed architecture.
Figure 13:
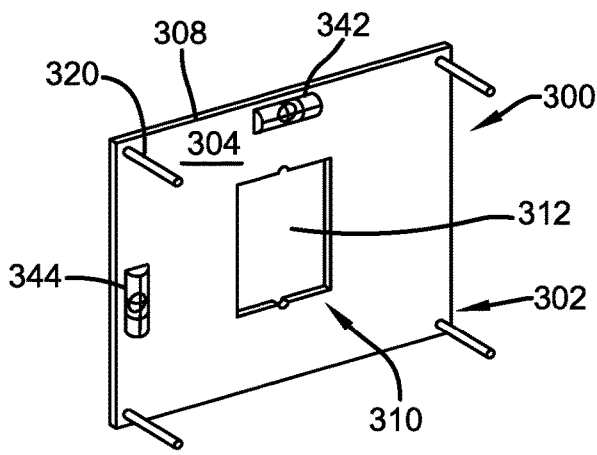
FIG. 13 illustrates an overhead perspective view of the template comprising a single gang cutout portion of the present invention in accordance with the disclosed architecture.
Figure 14:
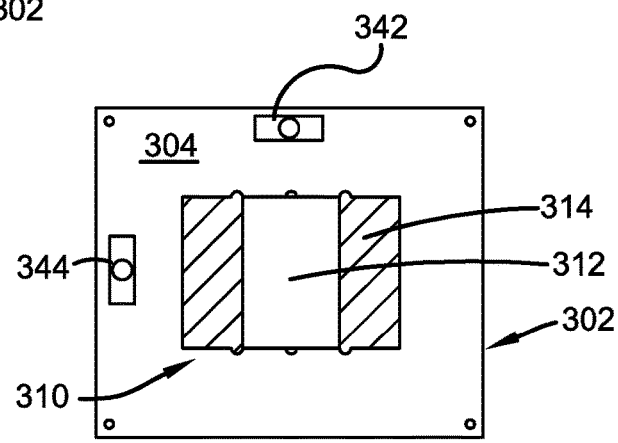
FIG. 14 illustrates an overhead perspective view of the template comprising the single gang and the double gang cutout portion of the present invention in accordance with the disclosed architecture.

In an additional embodiment, a template 300 for installing an electrical box 20 is illustrated in FIGS. 11-14. The template 300 comprises a mat plate 302 and an electrical box cutout 310 cut into and within the mat plate 302. The mat plate 302 comprises an outside surface 304, an inside surface (not shown) for abutting the wall 30, and a perimeter. The mat plate 302 may be a rigid or flexible piece of plastic or metal material. The electrical box cutout 310 is sized as a single gang electrical box cutout 312 dimensioned to receive a single gang electrical box as illustrated in FIG. 11, or a double gang electrical box cutout 314 dimensioned to receive a single gang electrical box as illustrated in FIG. 12. As illustrated in FIG. 14, the electrical box cutout 310 may have both the single gang electrical box cutout 312 and the double gang electrical box cutout 314.

The template 300 further comprises a plurality of wall attachment components 320 for holding the mat plate 302 to the wall 30. The plurality of wall attachment components 320 may be holes for mechanical fasteners (e.g., reusable screws, nails, bolts, etc.), barbs attached to the inside surface of the mat plate 302, suction cups, or the like. The template 300 further comprises a level sensing component 340. The level sensing component 340 may be embedded in or attached to the outside surface 304 of the mat plate 302. The level sensing component 340 may comprise a horizontal level 342 and a vertical level 344 to adjust plumb.

It is contemplated that the templates 100, 200, and 300 constructed in accordance with the present invention will be tailored and adjusted by those of ordinary skill in the art to accommodate various levels of performance demand imparted during actual use. Accordingly, while this invention has been described by reference to certain specific embodiments and examples, it will be understood that this invention is capable of further modifications. This application is, therefore, intended to cover any variations, uses or adaptations of the invention following the general principles thereof, and including such departures from the present disclosure as come within known or customary practice in the art to which this invention pertains and fall within the limits of the appended claims.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A template for installing an electrical box comprising:
   an elongated member;
   a pair of stud gripping components extending perpendicularly from a back side of the elongated member; and
   a pair of electrical box cutouts, each cutout extending inward into a side of the elongated member opposite the opposing cutout.

2. The template of claim 1, wherein each of the stud gripping components comprise a pair of stud engaging elements.

3. The template of claim 1, wherein one of the pair of stud gripping components is positioned toward a top of the elongated member and the other is positioned toward a bottom of the elongated member.

4. The template of claim 1, wherein a space between the pair of electrical box cutouts is a width of a side of a wall stud.

5. The template of claim 1 further comprising a plurality of spacers positional between the back side of the elongated member and a wall stud.

6. The template of claim 1 further comprising a level sensing component embedded in the elongated member.

7. A template for installing an electrical box comprising:
   an elongated member;
   a pair of stud gripping components extending perpendicularly from a back side of the elongated member;
   a first pair of electrical box cutouts, each cutout extending inward into a side of the elongated member opposite the opposing cutout at a first height; and
   a second pair of electrical box cutouts, each cutout extending inward into the side of the elongated member opposite the opposing cutout at a second height.

8. The template of claim 7, wherein the first pair of electrical box cutouts are centered approximately between 17.5 and 18 inches from a bottom of the elongated member.

9. The template of claim 7, wherein the second pair of electrical box cutouts are centered approximately between 45.5 and 46 inches from a bottom of the elongated member.

10. The template of claim 7, wherein each of the stud gripping components comprise a pair of stud engaging elements.

11. The template of claim 7, wherein a space between each pair of electrical box cutouts is a width of a side of a wall stud.

12. The template of claim 7 further comprising a plurality of spacers positional between the back side of the elongated member and a wall stud.

13. The template of claim 11, wherein the plurality of spacers are different thicknesses.

14. The template of claim 7 further comprising a level sensing component embedded in the elongated member.

15. The template of claim 13, wherein the level sensing component comprises a horizontal level and a vertical level.

16. A template for installing an electrical box comprising:
a mat plate;
an electrical box cutout within the mat plate;
a plurality of wall attachment components for fixing the mat plate to a wall; and
a level sensing component embedded in the mat plate.

17. The template of claim 15, wherein the electrical box cutout is sized to a single gang electrical box.

18. The template of claim 15, wherein the electrical box cutout is sized to a double gang electrical box.

19. The template of claim 15, wherein level sensing component comprises a horizontal level and a vertical level.

20. The template of claim 15, wherein the template is flexible.

\* \* \* \* \*